Oct. 20, 1936.     J. H. DORAN     2,058,301
BELLOWS
Filed Dec. 18, 1934

Inventor:
John H. Doran,
by Harry E. Dunham
His Attorney.

Patented Oct. 20, 1936

2,058,301

UNITED STATES PATENT OFFICE 2,058,301

BELLOWS

John H. Doran, Scotia, N. Y., assignor to General Electric Company, a corporation of New York Application December 18, 1934, Serial No. 758,148

1 Claim. (Cl. 137—156.5)

The present invention relates to bellows, sylphons or accordions comprising a plurality of disk elements with the inner and outer edges of adjacent elements united by means of fused metal such as welding. Bellows of this kind are used, for example, in connection with temperature and pressure responsive devices and in other cases as a flexible connecting means between two sections of a conduit which during operation are subjected to varying temperature and pressure. Failure of bellows during operation is in many cases the result of excessive strains and stresses exerted under high pressure onto the welded portions of adjacent disk elements.

The object of my invention is to provide an improved construction of bellows, sylphons or accordions in which the welded portions of adjacent disk elements are relieved from excessive strains and stresses whereby leakage and like failure of the bellows is considerably minimized.

For a consideration of what I consider to be novel and my invention, attention is directed to the following description and the claim appended thereto in connection with the accompanying drawing which forms a part of my specification.

Figure 1:
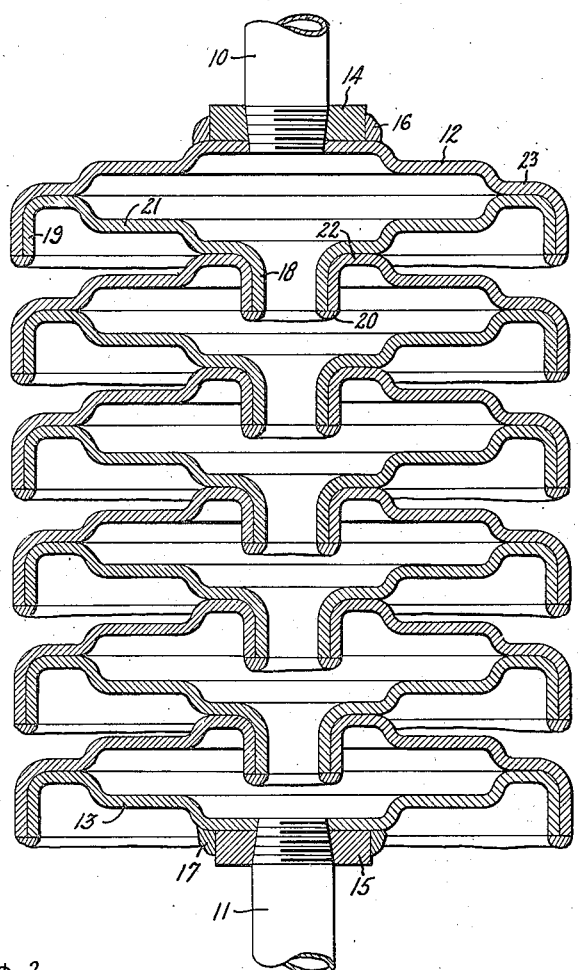
Figure 2:
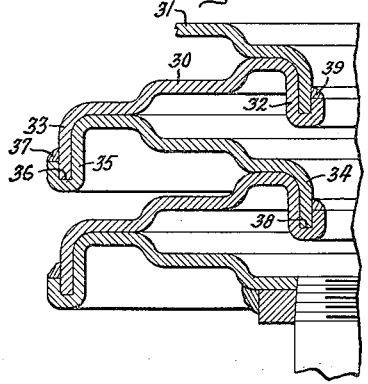

In the drawing, Fig. 1 shows a bellows, sylphon or accordion in accordance with my invention and Fig. 2 shows a modification of the arrangement shown in Fig. 1.

The bellows in Fig. 1 forms a flexible connecting means between two conduit sections 10 and 11 to permit relative expansion and contraction of these sections during changing operating conditions without setting up undesirable stresses in the conduit. The bellows comprises a plurality of disk elements, the outer elements 12 and 13 of which have central portions reinforced by rings 14 and 15 respectively. These rings are fastened or united with the outer disk elements by welds 16 and 17 respectively. The conduit sections 10 and 11 are screw-threaded into said reinforced outer disk elements.

In accordance with my invention each disk element has an inner cylindrical portion 18 and an outer cylindrical portion 19. By "cylindrical portions" I mean portions having cylindrical surfaces with respect to the axis of the bellows. The surfaces of the cylindrical portions of adjacent elements engage each other and the edges of said cylindrical portions are united by welds 20. In the present example, the bellows is made from formed or pressed disk elements. Each disk element has a central portion 21 and inner and outer offset portions 22 and 23 respectively. Adjacent disk elements engage each other along the aforementioned cylindrical surfaces as well as along plane or disk surfaces formed by said offset portions 22 and 23 respectively. With this arrangement, comparatively small stresses and strains are exerted on the welded portions so that the bellows may be subject to considerable pressure changes without danger as to overloading said welded portions.

The bellows in Fig. 2 comprises formed disks 30 and 31, corresponding to the disks 12 of Fig. 1. The disks 30 have inner and outer cylindrically shaped portions 32 and 33 engaging corresponding inner and outer cylindrical portions 34 and 35 respectively of the disks 31. In order to form rigid connections between the inner and outer portions of the disk, the cylindrical portions 35 are crimped or bent to form a groove 36 for receiving the cylindrical portions 33 of disk 30. The outer edge of disk 31 is united with the cylindrical portion 33 by fused metal 37. The inner cylindrical portion 32 of the disk 30 is similarly bent or crimped to form a groove 38 for receiving the edge of the cylindrical portion 34 of the disk 31. The edge of the crimped cylindrical portion 32 is united with the cylindrical portion 34 by a weld 39. In this arrangement the welded portions are subjected to comparatively low stresses only during operation of the bellows.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

A bellows to be subject to high pressure fluid comprising a plurality of disks, each disk having an inner, an intermediate and an outer annular portion, the inner and outer portions of each disk being set off in opposite directions, the inner portions of adjacent disks being set off in opposite directions whereby the set-off portions space the disks apart, the margins of the inner and outer portions being bent in the same directions to define substantially cylindrical surfaces, and welds uniting the edges of adjacent disks.

JOHN H. DORAN.